United States Patent [19]

van Zuijlen

[11] Patent Number: 5,060,155

[45] Date of Patent: Oct. 22, 1991

[54] METHOD AND SYSTEM FOR THE REPRESENTATION OF MULTIPLE ANALYSES IN DEPENDENCY GRAMMAR AND PARSER FOR GENERATING SUCH REPRESENTATION

[75] Inventor: Job M. van Zuijlen, Utrecht, Netherlands

[73] Assignee: Bso/Buro Voor Systeemontwikkeling B.V., Utrecht, Netherlands

[21] Appl. No.: 472,831

[22] Filed: Jan. 31, 1990

[30] Foreign Application Priority Data

Feb. 1, 1989 [NL] Netherlands ................. 8900247

[51] Int. Cl.⁵ .................. G06F 15/38; G06F 1/00
[52] U.S. Cl. ........................... 364/419; 364/200; 364/900
[58] Field of Search ........... 364/419, 900 MS File, 364/200 MS File, 943, 274.8, 286.2

[56] References Cited

U.S. PATENT DOCUMENTS

| | | | |
|---|---|---|---|
| 4,829,423 | 5/1989 | Tennant et al. ........... | 364/200 |
| 4,849,898 | 7/1989 | Adi ............................. | 364/419 |
| 4,887,212 | 12/1989 | Zamora et al. ............. | 364/419 |

FOREIGN PATENT DOCUMENTS 0012777 7/1980 European Pat. Off. .
0274281 7/1988 European Pat. Off. .

OTHER PUBLICATIONS

Proceedings of the IEEE, Eurotra: A European Perspective on MT, vol. 74, No. 7, Jul. 1986, pp. 979-992.
Communications of the ACM, vol. 17, No. 11, Nov. 1974, pp. 621-630, A Locally-Organized Parser for Spoken Input.

*Primary Examiner*—Dale M. Shaw
*Assistant Examiner*—Xuong M. Chung
*Attorney, Agent, or Firm*—Bachman & LaPointe

[57] ABSTRACT

Method for unambiguously coding multiple parsing analyses of a natural language word sequence in dependency grammar in which dependencies are defined between pairs of words, each pair consisting of a superordinate word or governor and a thereto related word or dependent. For each word in the sequence a word index is determined, representing the rank of order of said word in the sequence. All possible dependents of each word are determined as well as the relation between the word and the dependents using a parsing algorithm in combination with a grammar and a dictionary in which all words of the language are stored together with their syntactic interpretation and an interpretation index, representing the rank order of the syntactic interpretation of the word in the dictionary in order to distinguish between multiple syntactic interpretations of said word. A syntactic network is determined which is represented as a tree consisting of nodes mutually coupled by edges and comprising at least one top node, one or more terminal nodes and eventually a number of intermediate nodes, each node being interpreted as an exlusive OR node serving as a pointer if there is only one alternative and serving as a choice point if there are several alternatives, whereby each of the pointer nodes is assigned to a word of the sequence and each edge is assigned to the syntactic relation between the two nodes coupled by said edge, whereby each node is coded by an identifier which in case of a pointer node is directly related to the entry of a word in the dictionary and in the case of a choice point comprises a list of further identifiers one of which has to be selected.

7 Claims, 7 Drawing Sheets

FIG. 10  MAXIMUM PHRASES OF "DOG BITES MAN IN PARK NEAR RIVER"

FIG. 11  MAXIMUM PHRASES OF FIGURE 10 AFTER CONSISTENCY CHECKING

Fig-12

O : CHOICE POINT

FIG. 14 MAXIMUM PHRASES OF "BEE FLIES LIKE A BIRD"

METHOD AND SYSTEM FOR THE REPRESENTATION OF MULTIPLE ANALYSES IN DEPENDENCY GRAMMAR AND PARSER FOR GENERATING SUCH REPRESENTATION

Parsing a natural language is the mapping of a sequence of words of that natural language onto larger units according to a grammar for that natural language. The larger units are called phrases or constituents. Usually, the sentence is the largest unit that can be recognized. The result of the mapping or syntactic analysis is shown in the form of a tree structure. The linguistic theory decides what the representation will look like; in the case of dependency grammar the analysis of the word sequence takes the form of a dependency tree which shows the words of the sequence and the syntactic relations between them. The sequence may be ambiguous, i.e. have more than one possible analysis, in which case the result will consist of a number of tree structures. There are various techniques to obtain multiple analyses; possibilities may be investigated in parallel or backtracking may be applied. Whatever technique is used, the analysis of a highly ambiguous sentence takes a large amount of time and generates an unmanageable number of trees. The object of the invention is now to improve this state of affairs and to offer a compact representation for the multiple analyses of ambiguous sentences and furthermore a parser that generates such a representation efficiently.

As already explained above, a problem in realistic natural language parsing is the syntactic ambiguity of sentences. A string of tokens in a programming language has only one interpretation, but a string of natural language words often has a number of interpretations. The ambiguity of natural language sentences deteriorates the efficiency of the parsing process, which is usually only known for the parsing of unambiguous sentences.

Ambiguity implies a search for alternative analyses Often, part of a new analysis is similar to an analysis already found. In other words, complete representation of all possible analyses leads to a large amount of redundancy. There have been proposals in which the internal representation of the parse history (the stack) is shared, thus avoiding duplication of this representation. This representation may be shown as a tree forest of constituent trees. It is, however, closely related to the internal representation used by the parser and cannot be represented in a different formalism without some form of conversion.

The approach followed by the invention is to take the definition of a formalism for the compact representation of syntactic ambiguities as the point of departure. The formalism is related to the linguistic theory chosen and not dictated by the parse process. In the underlying case dependency grammar is chosen.

With reference to the chosen linguistic theory it is remarked that there are further linguistic theories such as the so-called constituent grammar. A parsing algorithm developed for a constituent grammer is for instance described in "An efficient augmented-context-free parsing algorithm" by Masaru Tomita, published in Computational Linguistics, volume 13, numbers 1-2, January-June 1987.

DEPENDENCY GRAMMAR

Dependency grammar is a theory that is concerned with the syntactic relations or dependencies between words in a phrase or a sentence. A dependency is defined between two words, which are classified according to their word classes. The superordinate word in the relation is called the governor, the other is called the dependent. A dependency syntax for a specific language used for implementing the invention consists of the following:

1. A classification of words with a description of how to recognize a word as a member of a certain word class.
2. A list of dependency relation types and, accordingly, dependent types.
3. A list of word-class-specific dependency patterns with a specification of which dependents are subject to subclass-specific dependency rules (i.e. the complement-adjunct distinction).
4. A specification of the possible syntactic forms of the dependents.

In certain languages it may be necessary to take word order into consideration as a means to establish a dependency, e.g. to distinguish the subject and the direct object.

Dependency grammar has a characteristic that is also found in categorial grammar, namely that there is no real distinction between lexical and phrasal categories. So notions like NP and VP are not significant: a noun or verb with dependents is still considered a noun or a verb. From the point of view of a governor a dependency tree is only one level deep; whatever takes place at a level lower than its own dependents is of no significance or should be communicated via its dependents. Unlike constituent grammar, dependency grammar has no starting symbol, such as S, and, therefore, it is possible to try and analyze any sequence of words as long as it contains a clearly defined end-marker.

The dependency analysis of such a sequence of words amounts to selecting a governor and collecting the words that could be dependents for that governor. The governor will in turn be a dependent for yet another governor and a possible analysis for the word sequence constitutes a consistent division of the words such that there is one top level governor that "encompasses" all words in the sequence, directly as dependents of this governor and indirectly as dependents of the dependents, and so on. If one or more dependents are optional or if there are one or more words with multiple syntactic interpretations there may be more solutions satisfying this criterion in which case the sequence is ambiguous.

The invention now offers first of all a method for unambiguously coding multiple parsing analyses of a natural language word sequence in dependency grammar in which dependencies are defined between pairs of words, each pair consisting of a superordinate word or governor and a thereto related word or dependent, said method comprising the following steps:

a) determining for each word in the sequence a word index, representing the rank of order of said word in said sequence and all possible dependents as well as the relation between said word and said dependents using a parsing algorithm in combination with a grammar defining all possible relations of the language and a dictionary in which all words of the natural language are stored together with their syntactic interpretation and an interpretation index, representing the rank order of the syntactic interpretation of the word in the dictionary in order to distinguish between multiple syntactic interpretations of said word.

b) defining a syntactic network which is represented as a tree consisting of nodes mutually coupled by edges and comprising at least one top node, one or more terminal nodes and eventually a number of intermediate nodes, each node being interpreted as an exlusive OR node serving as a pointer if there is only one alternative and serving as a choice point if there are several alternatives, whereby each of the pointer nodes is assigned to a word of the sequence and each edge is assigned to the syntactic relation between the two nodes coupled by said edge, whereby each node is coded by an identifier which in case of a pointer node is directly related to the entry of a word in the dictionary and in the case of a choice point comprises a list of further identifiers one of which has to be selected.

By introducing choice points in the syntactic network it is possible to obtain an unambiguously coded syntactic network covering all the possible parsing analyses of the natural language word sequence in such a way that the coded syntactic network can be used in further processing steps for instance in an automatic translation system without the necessity to select beforehand one of the various multiple analyses as the correct one.

A further advantage obtained by the method according to the invention is the fact that the necessary memory space to store all the multiple parsing analyses of a natural language word sequence is considerable decreased because only the unavoidable copies of part of a subtree are stored whereas in comparison with the state of the art the major number of copies of parts of subtrees is avoided.

The invention will now be explained in further detail with reference to the attached drawings.

As introduction to the detailed explanation of the invention first of all the various possible syntactic ambiguities will be explained in more detail.

STRUCTURAL AMBIGUITY

A close look at syntactic ambiguities shows that they are of different types. In the first place, there is the possibility that the analysis of a phrase can be attached at more than one position in the analysis tree of the sentence that contains the phrase. For example:

EXAMPLE 1

Structural ambiguity

---
We see the man in the park
interpretation 1
    We see someone (the man in the park)
interpretation 2
    We see the man somewhere (in the park)

---

The preposition phrase in the park is either attached to the main verb see or to the noun man. These alternatives give rise to two different representations. Both representations are illustrated in FIGS. 1a and 1b respectively.

For the meaning of the various abbreviations used in the figures and in the further description, reference is made to the list of abbreviations at the end of this description.

Figure 1A:
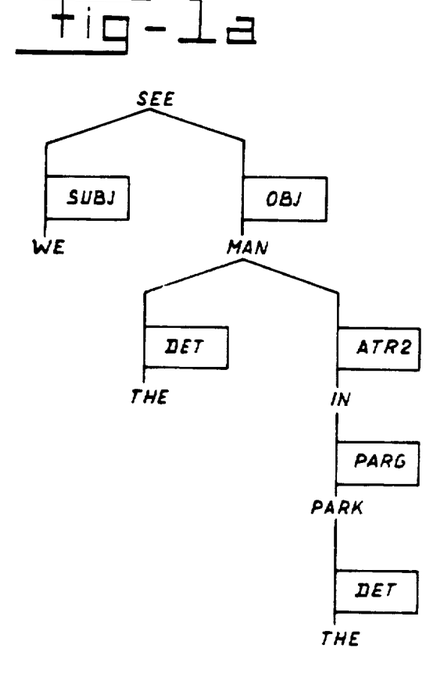
FIGS. 1a and 1b illustrate an example of a word sequence with structural ambiguity.
Figure 1B:
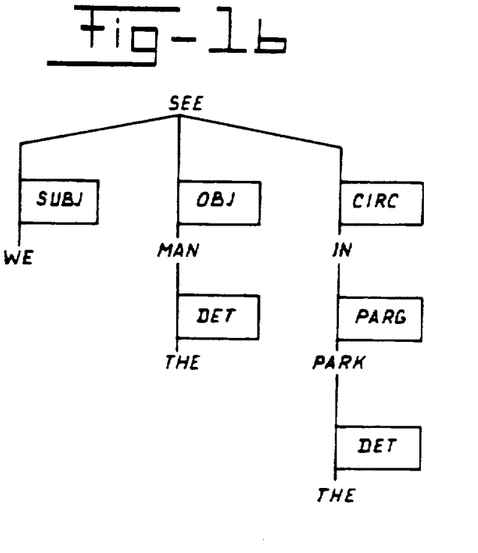

The type of ambiguity illustrated in FIGS. 1a and 1b is called structural and is related to the grammar of the language, which stipulates that a PP can be combined with a verb as well as a noun to form a well-formed phrase.

Word-Specific Ambiguity

A different type of ambiguity may appear in (written) sentences that contain homographs, i.e. different words that are spelled the same. This type of ambiguity, which we will call word-specific, is not directly related to grammar rules, but is accidental and highly language dependent (English being an extreme case). A word may have a number of syntactic interpretations, i.e. it may show categorial ambiguity or there may be differences in the feature sets associated with the various interpretations.

EXAMPLE 2

Categorial ambiguity

---
The bee flies like a ladybird
interpretation 1
    (The bee) flies (like a ladybird) → The bee flies in the manner of a ladybird.
interpretation 2
    (The bee flies) like (a ladybird) → The bee flies are fond of a ladybird.

---

The words "flies" and "like" display categorial ambiguity, i.e. they can belong to different categories. In example 2 "flies" may be a noun or a verb and "like" may be a preposition or a verb. Notice that it is difficult to predict the total number of interpretations in advance. The possibilities depend on the types of structure the grammar allows; "like" is only interpreted as a preposition when "flies" is interpreted as a verb and "like" is only interpreted as a verb when "flies" is interpreted as a noun.

Figure 2A:
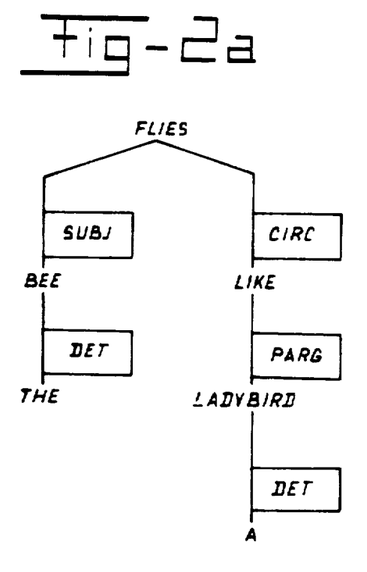
FIGS. 2a and 2b illustrate an example of a word sequence with word-specific ambiguity.
Figure 2B:
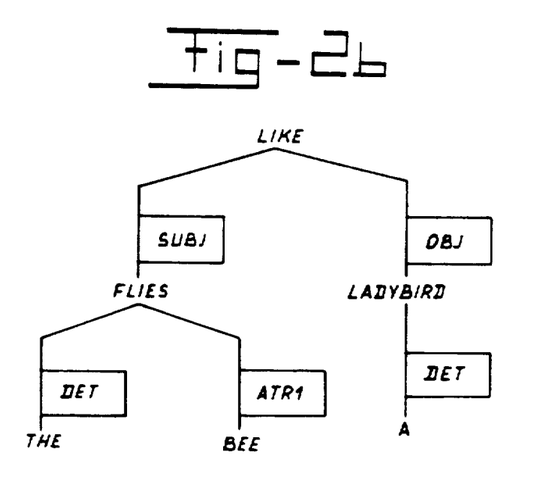

These figures show the dependency trees for the two interpretations of "The bee flies like a ladybird".

There is a second kind of categorial ambiguity that occurs with certain words that can be adverbs as well as adjectives.- When those are used as premodifier in a noun phrase, the result is two analyses that are only partially different.

EXAMPLE 3

Categorial ambiguity

They fund more modern houses
interpretation 1
    They fund (more) (modern houses) → They fund more houses that are modern
interpretation 2
    They fund (more modern) houses → They fund houses that are more modern The word "more" is either an adjective and then it modifies "houses", or it is an adverb in which case it modifies "modern".

Figure 3A:
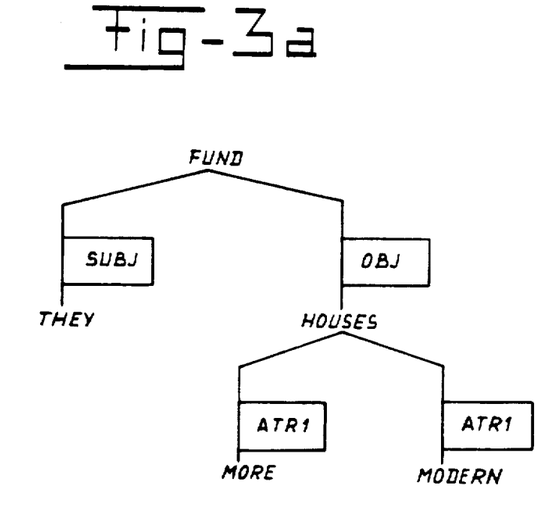
FIGS. 3a and 3b illustrate another example of a word sequence with word-specific ambiguity.
Figure 3B:
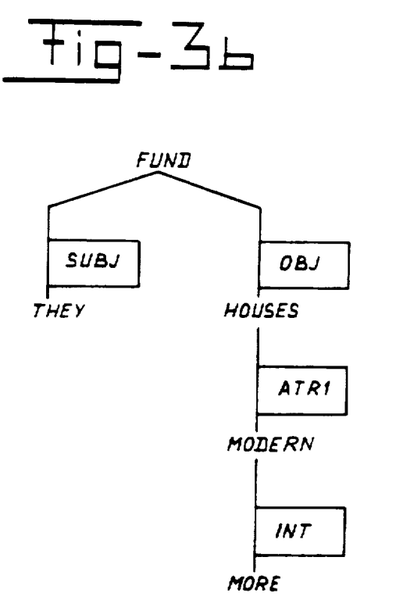

The analyses of "They fund more modern houses" are represented by the two diagrams in FIGS. 3a and 3b.

The main difference between the two analyses is the governor of more. In this respect it resembles the representations in case of structural ambiguity.

Two homographs may have the same category but differ with respect to some other syntactic feature, as shown in the following example.

EXAMPLE 4

Feature-determined ambiguity

They can fish
interpretation 1
    They can (are able to) fish (=verb)
interpretation 2
    They can (put in tins) fish (=noun)

The word "can" is a verb in both cases but there is a difference in valency: "can" takes either a direct object or an infinitive. We will call this feature-determined ambiguity. However, the ambiguity is only revealed because of the categorial ambiguity of "fish", which may be either a verb or a noun. The sentence "They can eat" for example, is not ambiguous, indicating that categorial and feature-determined ambiguity only become visible in specific syntactic contexts.

Figure 4A:
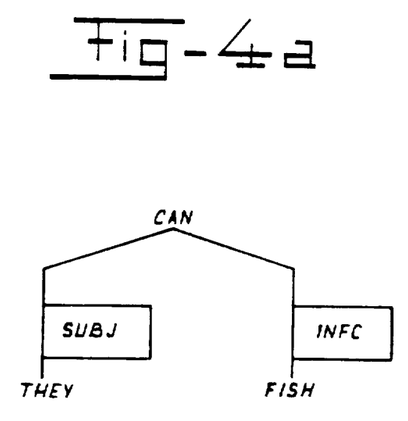
FIGS. 4a and 4b illustrate an example of a word sequence with feature-determined ambiguity.
Figure 4B:
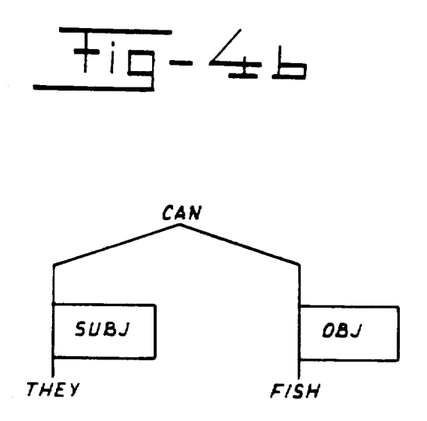

The analyses of "They can fish" are represented by the two dependency trees in FIGS. 4a and 4b.

An Estimate of the Number of Interpretations

It will be clear that it is difficult to determine how many alternative interpretations will be the result of word-specific ambiguity. The examples given indicate already that it is not very easy to construct sentences that display this kind of ambiguity, even in English. Structural ambiguity, however, is a common and often unavoidable phenomenon. Sentences that contain a sequence of PPs are a good example. Each PP that is added also provides an extra attachment point for its successor. The following table gives the number of analyses generated by a parser as function of the length of the PP sequence (sequence of prepositional phrases) for sentences containing one NP (noun phrase) such as "the man on a bench in the park near the river. . ." and without further ambiguities.

| Number of PPs | Number of Analyses |
|---|---|
| 1 | 1 |
| 2 | 2 |
| 3 | 5 |
| 4 | 14 |
| 5 | 42 |
| 6 | 132 |

This shows that a common representation for the alternatives due to structural ambiguity pays off very quickly indeed.

In the FIGS. 1-4 the alternative analyses for an ambiguous sentence is by way of a set of separate analysis trees. Since the analysis trees often show partial structural similarity, it is worthwhile to represent alternatives in the same representation. In the following section first the requirements for such a representation will be discussed in an informal way and then a formalism or description language will be developed in which these requirements can be expressed.

Choice Points and Structure Sharing

Figure 5:
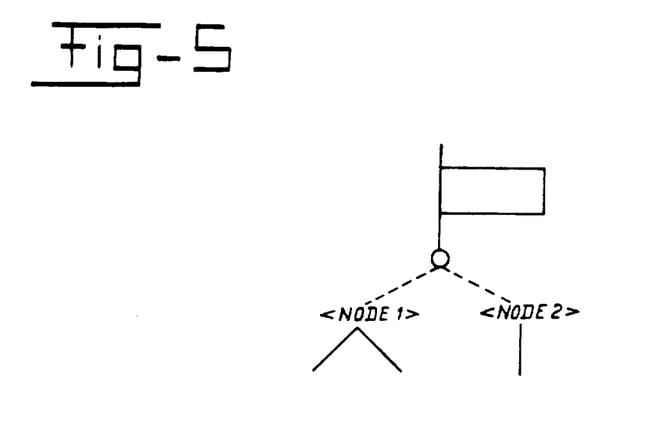
FIG. 5 illustrates a choice point.

A single representation for multiple analyses may be considered an ambiguous structure that can be interpreted in various ways resulting in a number of unambiguous interpretations. Each interpretation has to coincide with a syntactic analysis of the input sentence. A method to indicate that there has to be made a selection in the structure is to insert a choice point at a specific position. The subordinate elements of the choice point may or may not be part of a specific interpretation. For an informal graphical representation of choice points the notation shown in FIG. 5 will be used.

Figure 6:
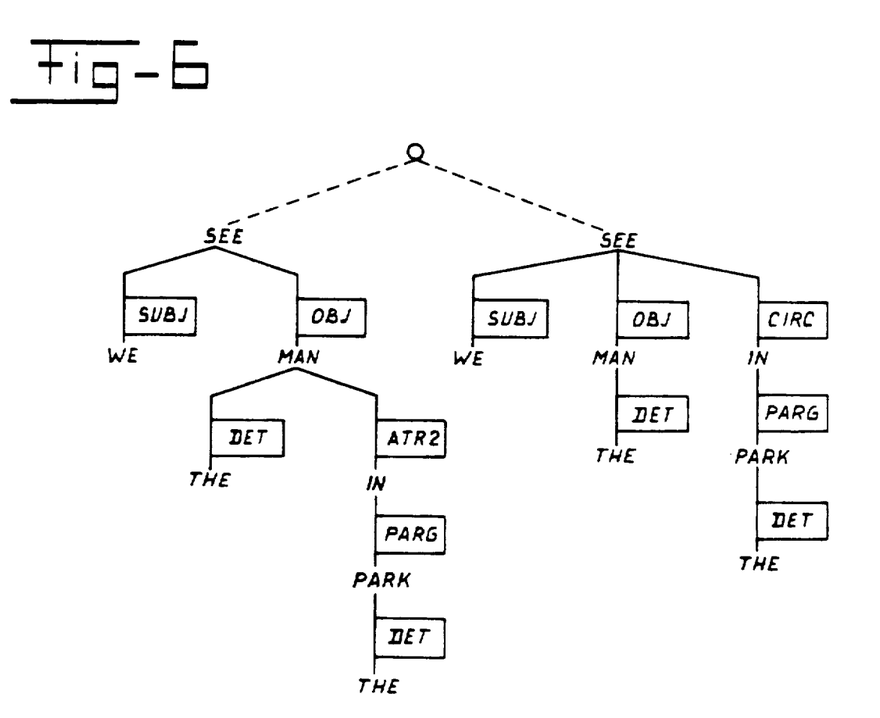
FIG. 6 illustrates the application of a choice point in the word sequence, the analyses of which were illustrated in FIGS. 1a and 1b.

A naive way of applying a choice point is shown in FIG. 6 in which the two representations illustrated in FIGS. 1a and 1b are combined by the choice point, functioning as top node.

Figure 7:
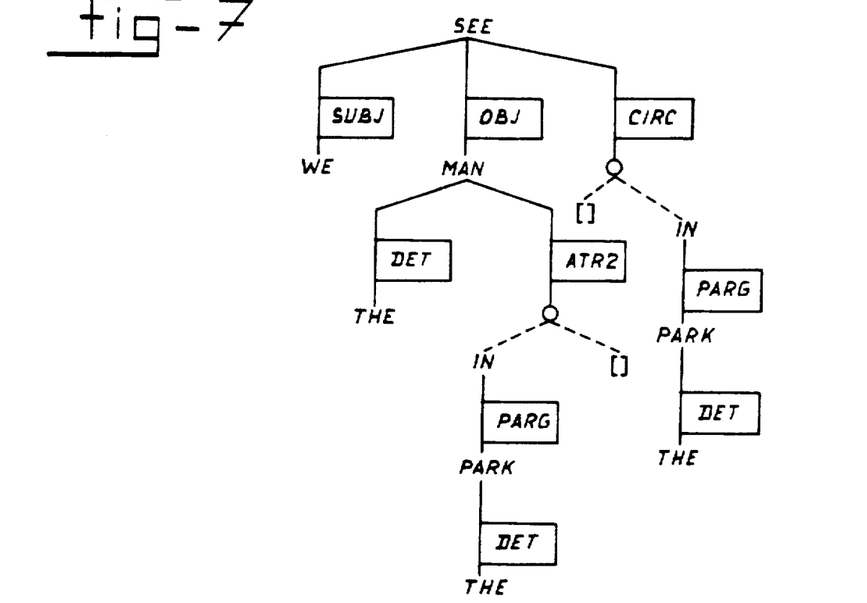
FIG. 7 illustrates a more sophisticated application of choice points in the word sequence, the different analyses of which were illlustrated in FIGS. 1a and 1b.

The two alternatives have a part in common, which makes the representation highly redundant. The representation can be improved by only duplicating the PP "in the park" and realizing the two attachment positions as choice points. That is illustrated in FIG. 7.

At each choice point there are two alternatives: the PP and the null tree, in the diagram indicated by [ ]. If the PP is chosen, the branch with the choice point is part of the representation, otherwise it is not. Notice that the procedure that interprets the representation has to guarantee that the PP is selected only once.

A further compaction can be obtained by having the PP shared by the two choice points. This is shown in the FIG. 8. This representation is no longer a tree but a directed graph.

Since it is not possible to represent a graph directly in textual form, it is necessary to develop a formalism or description language which can be used to give a description of a graph. The requirements of this description language are that it enables us to represent choice points and indicate the sharing of common structures.

Trees and Graphs

A common definition of a graph is G = (V, E), with V a set of vertices (nodes) and E a set of edges (arcs). The vertices and edges have names, e.g. the words of a sentence and the relations between the words, respectively. Diagram 1 shows a possible notation for vertices and edges:

| vertex | ::= <node> |
|---|---|
| edge | ::= <relation> : <governor> / <dependent> |
| node | ::= <term> |
| relation | ::= <atom> |
| governor | ::= <node> |
| dependent | ::= <node> |

Using this notation the dependency tree for the sentence "We see him" is illustrated in Diagram 2. The nodes (or vertices) are simplified in that they only contain words.

```
[see, [
    [SUBJ, we, []],
    [OBJ, him, []]]
]
```

The corresponding graph representation for "We see him" is:

([we, see, him], [SUBJ;see/we, OBJ:see/him])

Although this graph formalism allows arbitrary connections between governors and dependents, it still has, nevertheless, a number of disadvantages. They can be summarized as follows:

1. The edge descriptor contains complete nodes, which leads to unnecessary redundancy.
2. The edge list is too unstructured to be practical for large representations.
3. There is no possibility to represent choice points.

The first problem can be solved by assigning a unique identifier to each node, indicating word index (i.e. the rank order of the word in the sentence) and interpretation index (i.e. the rank order of the syntactic interpretation of the word in the dictionary) and using this node identifier whenever it is necessary to refer to a node. The nodes themselves (which we will call lexical nodes) will consist of a node identifier and a node value which contains the word and syntactic information on the word. This leads to the following notation of lexical nodes and node identifiers:

| lexical_node | ::= <node_identifier> / <node_value> |
|---|---|
| node_identifier | ::= <word_index> : <interpretation_index> |
| node_value | ::= <term> |
| word_index | ::= <integer> |
| interpretation_index | ::= <integer> |

For example, the first interpretation (i.e. entry in the syntactic dictionary) of the word "see" will be referred to as 2;1. The (simplified) lexical node for that interpretation of "see" becomes 2:1/see.

The second difficulty can be solved by maintaining the tree structures for unambiguous constellations of vertices and edges. So, instead of a list of edges there will be a list of trees. The nodes of the trees serve as reference nodes and contain one or more references to other trees or to lexical nodes.

The introduction of node identifiers suggests a simple method to represent choice points. A choice point is an exclusive-OR node; one alternative has to be chosen. We can model this by representing the nodes as a list of node identifiers and stipulating that at least one and not more that one element has to be selected. This condition makes it possible to represent all reference nodes as lists: if the list has more than one element, it is a choice point, otherwise it is a node with one obligatory element.

Implementing the modifications proposed in the previous section results into the following representation for "We see him" (Diagram 4). To indicate the difference with the usual graph, we will call this a structured syntactic network, abbreviated in the following part of the description as SSN.

```
([1:1/we, 2:1/see, 3:1/him],
    ]
        [[2:1], [
            [SUBJ, [1:1], []],
            [OBJ, [3:1], []]]
        ]
    ]
)
```

Notice the resemblance with the tree representation shown in Diagram 2. By including the lexical node list and the tree list in a single list, an unlabeled tree representation of the syntactic network is obtained. To maintain uniformity in representation a preceding label is added, serving as a network identifier. For the same reason the label GOV is added to the tree in the list.

The result thereof is the modified SSN shown in diagram 5.

```
[ ssn_1, [1:1/we, 2:1/see, 3:1/him], [
    [ GOV, [2:1], [
        [SUBJ, [1:1], []],
        [OBJ, [3:1], []]]
    ]]
]
```

To represent multiple analyses with an SSN, some additional notation is needed in order to be able to-refer to the trees in the list. Since dependency grammar is used, the node identifier of the top node of a tree could also serve as the identifier of that tree. However, certain alternative analyses of phrases have the same top node, as, for example, the NP "more modern houses" in "They fund more modern houses" (see FIG. 4a and 4b). Therefore, a duplicate index is added to the node identifier of the top node; the combination will then serve as the tree identifier. The symbol 0 signifies a reference to the null tree. This leads to the notation of tree identifiers shown in diagram 6:

| tree_identifier | ::= <node_identifier> - <duplicate_index> | 0 |
|---|---|
| duplicate_index | ::= <integer> |

The two alternative trees for more modern houses would have the identifiers 5:1-1 and 5;1-2.

In order to indicate the starting point of the SSN and handle cases that are ambiguous at the highest level (e.g. "They can fish", FIGS. 4a and 4b), the ssn entry is introduced, which will be the first tree in the tree list. It is recognizable through a so-called entry node, symbolized by [0:0], and it contains a reference to one or more of the subsequent trees in the list which will be referred to as ssn trees.

It turns out that structural and word-specific ambiguity can be distinguished by looking at the reference nodes, which are, in fact, node and tree identifier lists. With structural ambiguity a single subtree is selected by one of a number of governors. This is illustrated in FIG. 7.

Each governor dominates a choice point presenting the specific subtree (or a lexical node) and the null tree as alternatives; so the reference node will contain a tree or a node identifier and the null tree identifier, e.g. [1:1-1, 0] or [1:1, 0], forming a structural ambiguity choice point.

With word-specific ambiguity, on the other hand, a single governor has to choose from a number of subtrees and/or lexical nodes. In this case, the governor dominates a reference node that serves as a word-specific ambiguity choice point and that contains a list with references to ssn trees or lexical nodes. Examples are [3:1-1, 3:2-1] (two ssn trees) and [1:1, 2:1-1] (a lexical node and an ssn tree).

The case in which a reference node has only a single reference is also meaningful for lexical nodes as well as ssn trees. With a reference to a lexical node, the reference node serves as a pointer to this lexical node, i.e. serves as lexical pointer. When it refers to an ssn tree, the reference node functions as a structure-sharing pointer, i.e. a pointer to a structure that can be shared by the alternative ssn trees resulting from word-specific ambiguity. For example, the NP "a ladybird" could be shared by the two analyses of "The bee flies like a ladybird" (see FIGS. 2a and 2b).

The additional notation necessary for the nodes of the trees in the SSN is listed in the following diagram.

```
tree_node        ::= [ 0:0 ] | <reference_node>
reference_node   ::= [ <reference> ] | <choice_point>
choice_point     ::= [ <reference>, 0] | [ <reference>
                     {, <reference> } + ]
reference        ::= <node_identifier> | <tree_identifier>
```

Using this notation, a further modified SSN for "We see him" is presented in Diagram 8.

```
[ ssn_1a, [1:1/we, 2:1/see, 3:1/him], [
  [ NIL, [0:0], [                    % ssn_entry
    [GOV, [2:1-1], []]]              % pointer to ssn_tree 2:1-1
  ]
  [ NIL, [2:1-1], [                  % ssn_tree 2:1-1
    [SUBJ, [1:1], []],               % pointer to lexical node
    [OBJ, [3:1], []]]
  ]]
]
```

Labels that do not refer to a syntactic relation, but are necessary to maintain uniformity in the tree formalism are called NIL. The ssn_ entry contains a subtree with the label GOV (the root label of the dependency tree) and a reference to a ssn_ tree.

Some SSNs for Ambiguous Sentences

We will now look at some examples of SSNs for ambiguous sentences. In Diagram 9 the SSN is shown of "They can fish" (cf. the trees of which are shown in FIGS. 4a and 4b), a sentence with word-specific ambiguity.

```
[ ssn_2, [1:1/they, 2:1/can, 2:2/can, 3:1/fish, 3:2/fish], [
  [ NIL, [0:0], [                    % ssn_entry
    [ GOV, [2:1-1, 2:2-1], []]]      % choice point between 2:1-1
                                       and 2:2-1
  ],
  [ NIL, [2:1-1], [                  % ssn_tree 2:1-1
    [SUBJ, [1:1], []],
    [INFC, [3:1], []]]               % fish=Verb
  ],
  [ NIL, [2:2-1], [                  % ssn_tree 2:2-1
    [SUBJ, [1:1], []],
    [OBJ, [3:2], []]]                % fish=Noun
  ]]
]
```

The ssn entry is used to represent ambiguity at top level: it contains a subtree with a choice point preceded by a GOV label.

For some applications it may be necessary to generate the alternatives from the SSN in a certain order. With word-specific ambiguity the alternatives associated with this ambiguity are included in one list. By taking the order of the list into account, it is possible to generate the alternatives in a specific order. This approach is not applicable with structural ambiguity. The alternative choices are divided among several choice points and there is no direct communication between these points. However, all choice points refer to the same ssn tree and by including a list of node identifiers of the relevant governors at the position of the top level label of the ssn tree, it is possible to control the order of selection. To obtain an unambiguous reference, the ssn tree that contains the governors has to be mentioned as well as the word index of each relevant governor in that tree. This should be repeated for all ssn trees that contain one or more relevant governors. The result is a parent list for each ssn tree. The root label of an ssn tree, then, will either consist of the atom NIL or a list of parent lists. Diagram 10 shows the format of the root label of an ssn tree.

```
root_label   ::= [ <parent_list>{ , <parent_list> }* ] | NIL
parent_list  ::= [ <tree_identifier>{ , <word_index> }+ ]
```

An example of a sentence with structural ambiguity is "we see the man in the park" the trees of which are already discussed with reference to FIGS. 1a, 1b. Its SSN is shown in Diagram 11.

```
[ssn_3, [1:1/we, 2:1/see, 3:1/the, 4:1/man, 5:1/in, 6:1/the,
7:1/park], [
  [ NIL, [0:0], [                    % ssn_entry
    [GOV, [2:1-1], []]]              % pointer to ssn_tree 2:1-1
  ],
  [ NIL, [2:1-1], [                  % ssn_tree 2:1-1
    [SUBJ, [1:1], []],
    [OBJ, [4:1], [
      [DET, [3:1], []]
      [ATR2, [5:1-1, 0], []]]        % choice point (ssn_tree
                                       5:1-1)
  ],
  [CIRC, [5:1-1, 0], []]]            % choice point (ssn_tree
                                       5:1-1)
  ],
  [ [[2:1-1, 4, 2], [5:1-1]], [      % ssn_tree 5:1-1 (with
                                       parent list)
    [PARG, [7:1], [
      [DET, [6:1], []]
```

```
      ]]
   ]]]
```

Figure 8:
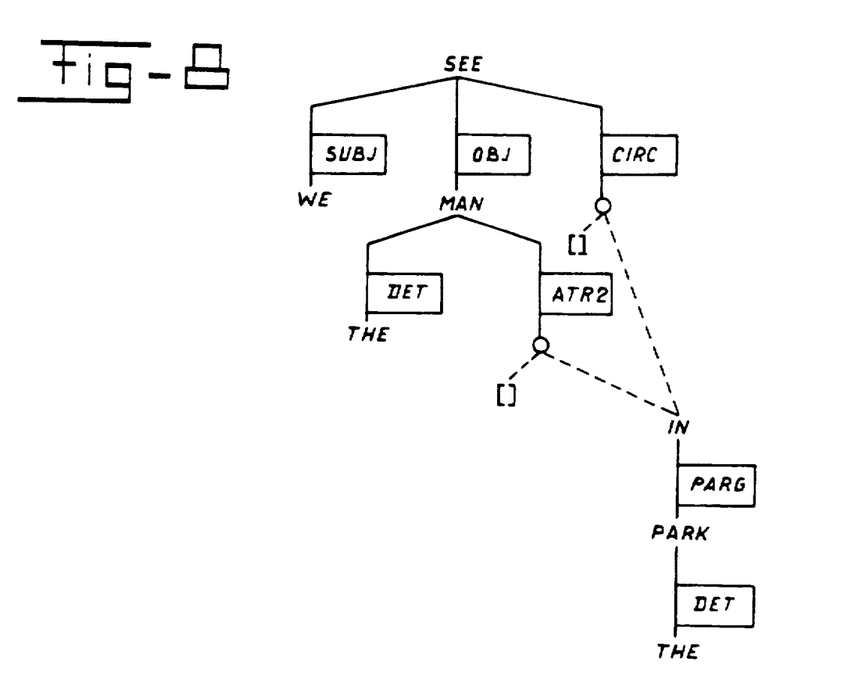
FIG. 8 illustrates a further developed embodiment of figure 7.
Figure 9:
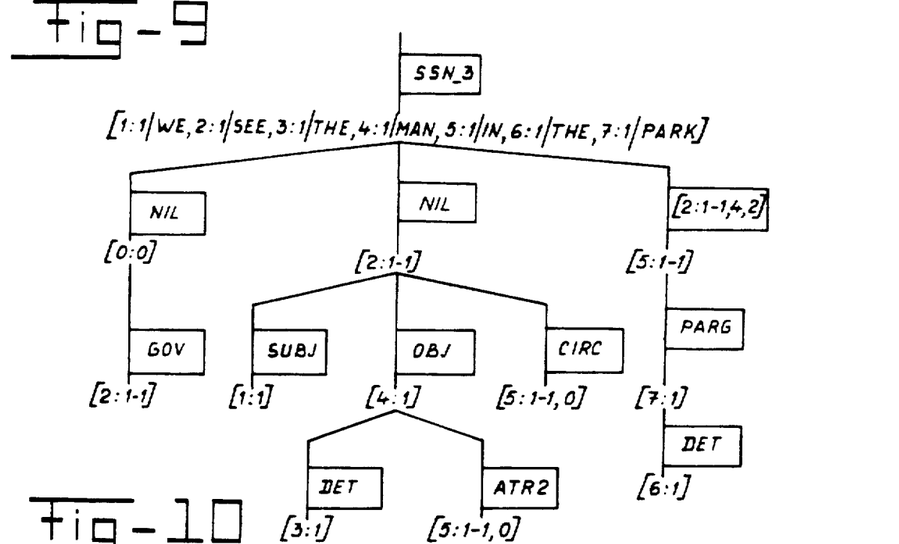
FIG. 9 illustrates the ultimate embodiment of the choice point application resulting into an unambiguously coded network structure covering both analyses illustrated in FIGS. 1a and 1b.

This sentence already served as an example to illustrate the necessity of a graph representation. To exemplify the difference between an informal graph representation as illustrated in FIG. 8 and the SSN, FIG. 9 shows a graphical representation of the SSN for "we see the man in the park".

In the following example, "They can fish near the harbor", there is combined word-specific and structural ambiguity. Diagram 12 shows the SSN of "They can fish near the harbor".

```
[ ssn_3, [1:1/they, 2:1/can, 2:2/can, 3:1/fish, 3:2/fish, 4:1/near,
    5:1/the, 6:1/harbor], [
  [ NIL, [0:0], [                    % ssn_entry
      [ GOV, [2:1-1, 2:2-1], []]]
  ],
  [ NIL, [2:1-1], [                  % ssn_tree 2:1-1
      [SUBJ, [1:1], []],
      [INFC, [3:1], [
          [CIRC, [4:1-1, 0], []]]    % choice point (ssn_tree
                                       4:1-1)
      ]]
  ],
  [ NIL, [2:2-1], [                  % ssn_tree 2:2-1
      [SUBJ, [1:1], []],
      [OBJ, [3:2], [
          [ATR2, [4:1-1, 0], []]]    % choice point
                                       (ssn_tree 4:1-1)
      ],
      [CIRC, [4:1-1, 0], []]         % choice point
                                       (ssn_tree 4:1-1)
      ]]
  ],
  [ [[2:1-1, 3], [2:2-1, 2, 3]], [4:1-1], [  % ssn_tree 4:1-1
      [PARG, [6:1], [
          [DET, [5:1], []]]
      ]]
]
```

The notation for the parent list (the label of ssn_trees. In the sentence "They fund more modern houses" the word "more" can have two different interpretations (adjective or adverb) resulting in two different analyses of the NP "more modern houses" (see FIGS. 3ak and 3b). In both cases the same node is top node of the alternative ssn trees so, in order to distinguish the trees, the duplicate index of the nodes is given two different values. Diagram 13 shows the SSN of "They fund more modern houses".

```
[ ssn_4, [1:1/they, 2:1/fund, 3:1/more, 3:2/more, 4:1/modern,
    5:1/houses], [
  [ NIL, [0:0], [                    % ssn_entry
      [GOV, [2:1-1], []]]
  ],
  [ NIL, [2:1-1], [                  % ssn_tree 2:1-1
      [SUBJ, [1:1], []],
      [OBJ, [5:1-1, 5:1-2], []]]    % choice point between
                                       5:1-1 and 5:1-2
  ],
  [ NIL, [5:1-1], [                  % ssn_tree 5:1-1
      [ATR1, [3:1], []],             % more = Adjective
      [ATR1, [4:1], []]]
  ],
  [ NIL, [5:1-2], [                  % ssn_tree 5:1-2
      [ATR1, [4:1], [
          [INT, [3:2], []]]          % more = Adverb
      ]]
  ]]
]
```

Although this SSN shows redundancy because of the duplication of part of the NP, the use of node identifiers limits the extra storage requirements.

A common word-specific ambiguity in English occurs with noun premodifiers that can be a noun as well as an adjective, as, for instance, light in "They see the light house". The SSN for this sentence is shown in diagram 14.

```
[ ssn_5, [1:1/they, 2:1/see, 3:1/the, 4:1/light, 4:2/light,
    5:1/house], [
  [ NIL, [0:0], [                    % ssn_entry
      [GOV, [2:1-1], []]]
  ],
  [ NIL, [2:1-1], [                  % ssn_tree 2:1-1
      [SUBJ, [1:1], []],
      [OBJ, [5:1], [
          [DET, [3:1], []],
          [ATR1, [4:1, 4:2], []]]    % direct reference to
                                       lexical nodes
      ]]
  ]
]
```

In this example the choice point in ssn_tree 2:1-1 refers directly to the lexical nodes in the node list, since the overall structure of the two alternatives represented by the SSN is the same.

Sometimes the ssn trees that represent alternative analyses can share a structure that is part of these analyses. An example of this is shown in the following diagram 15 representing the SSN of "He claims that the bee flies like a juicy ladybird" in which "a juicy ladybird" is shared.

```
[ ssn_6, [1:1/he, 2:1/claims, 3:1/that, 4:1/the, 5:1/bee, 6:1/flies
    6:2/flies, 7:1/like, 7:2/like, 8:1/a, 9:1/juicy, 10:1/ladybird],[
  [ NIL, [0:0], [                    % ssn_entry
      [GOV, [2:1-1], []]]
  ],
  [ NIL, [2:1-1], [                  % ssn_tree 2:1-1
      [SUBJ, [1:1], []],
      [PROC, [3:1], [
          [SUBC, [6:1-1, 7:2-1], []]]
      ]]
  ],
  [ NIL, [6:1-1], [                  % ssn_tree 6:1-1; flies = Verb
      [SUBJ, [5:1], [
          [DET, [4:1], []]]
      ],
      [CIRC, [7:1], [                % like = Preposition
          [PARG, [10:1-1], []]]     % pointer to ssn_tree 10:1-1
      ]]
  ],
  [ NIL, [7:2-1], [                  % ssn_tree 7:2-1; like = Verb
      [SUBJ, [6:2], [                % flies = Noun
          [DET, [4:1], []],
          [ATR1, [5:1], []]]
      ],
      [OBJ, [10:1-1], []]]          % pointer to ssn_tree 10:1-1
  ],
  [ NIL, [10:1-1], [                 % ssn_tree 10:1-1
      [DET, [8:1], []],
      [ATR1, [9:1], []]]
  ]
]
```

The above described Structured Syntactic Network SSN enables all analyses of a sentence to be put in a single representation, and consists of a list of dependency trees in which the words are replaced by lists of pointers. A pointer list with a single element is a reference to a word or a subtree and constitutes a solid connection as in a traditional tree. A pointer list with more than one element represents a choice point and is used to indicate alternatives. So, the SSN is an ambiguous structure and each possible interpretation coincides with a possible analysis of the sentence.

In the following part of the description a parser will be described which has the task to generate an SSN in a non-trivial way, that is, other than by merging all traditionally generated analysis trees.

As already indicated above, the dependency analysis of a sequence of words amounts to selecting a governor and collecting the words that could be dependents for that governor. The governor will in turn be a dependent for yet another governor and a possible analysis for the word sequence constitutes a consistent division of the words such that there is one top level governor that "encompasses" all words in the sequence, directly as dependents of this governor and indirectly as dependents of the dependents, and so on. If one or more dependents are optional or if there are one or more words with multiple syntactic interpretations there may be more solutions satisfying this criterion in which case the sequence is ambiguous.

The parser according to the invention is based on a different approach in which it is not the first interest to find consistent solutions directly, but in which a two stage strategy is employed. In the first stage, for each word in the sequence that is a potential governor, its maximum phrase is constructed, that is a tree containing all possible dependents of the word irrespective of the fact whether or not a dependent has already been taken by another governor. The dependents will not be included literally in the dependency tree of the governor but referred to by means of a unique index. The result of the analysis will be the set of maximum phrases for the sequence.

Each maximum phrase in the set encompasses a subsequence (or, possibly, an ordered subset) of the sequence of words. Since overall consistency has not been tested, two subsequences may have words in common. Therefore, in the second stage of the parsing process all possible solutions will be checked for consistency. For example, given the sequence ABC and the maximum phrases P1, P2 and P3 for the governors A, B and C, respectively. Let P1 cover ABC, P2 cover BC and P3 cover C. P1 and P2 have P3 in common, so both contain a pointer to P3. There are three alternatives:
1. P3 is optional for both P1 and P2; the pointers to P3 are changed into choice points.
2. P3 is obligatory for either P1 or P2; the pointer to P3 in the phrase for which P3 is optional will be deleted.
3. P3 is obligatory for both P1 and P2; no solution is possible and an error correction procedure will be initiated.

The number of maximum phrases is equal to the total number of syntactic interpretations of the words of the sequence. Some phrases will only contain a single word, others will (indirectly) encompass the complete sequence. There will be one or more phrases at top level and they will serve as the starting point for a consistency check in which phrases with common dependents are compared as outlined above. Moreover, a solution should encompass all words in the sequence. Maximum phrases that are not part of any solution are deleted, the others constitute the SSN of the sequence.

THE CONSTRUCTION OF MAXIMUM PHRASES

It is already mentioned that there is no real difference between lexical and phrasal categories in dependency grammar. Therefore, both words as well as subtrees can be viewed as elements with a certain category. So instead of a sequence of words or a sequence of subtrees, it is possible to speak more generally about a sequence of categories. This emphasizes the fact that there is no real distinction between a word and a subtree from the point of view of a governor.

Given a sequence of categories, the task of the parser is to find the set of maximum phrases for that sequence. It will scan the sequence from left-to-right (or, alternatively, categories are added to the sequence during the parsing process) and look for a possible governor, i.e. a category that takes dependents. Categories that do not qualify are marked as closed, and are considered maximum phrases in their own right. When a governor is found, it will be marked as the current governor and the parser will first look left in the sequence, to see if it contains a possible dependent. If so, the syntactic relation between the governor and the dependent is determined and a subtree is added to the governor, with a label stating the name of the relation and a pointer node containing the index of the dependent. If the dependent is optional, the pointer node also contains a reference to the null tree, so that optionality can be recognized directly. The index of the governor is added to the parent list of the dependent, a list that contains references to all possible governors of the dependent.

The parser will check the next category left from the current governor to see whether it is a possible dependent. If all possible dependents left of the governor are found, the parser will look in the sequence of categories to see if there are any dependents right of the current governor. When all possible governors on the right-hand side of the governor are found as well, its maximum phrase is completed, and it is marked as closed. The parser will search for the next non-closed governor in the sequence and try to find its dependents. This continues until the end marker of the sequence is reached.

The procedure as described needs some refinement in order to work properly. As it is now, it will halt as soon as a category is found that is not a dependent of the current governor and thus blocks access of the governor to the next category. For example, in the sequence "see the man" "see" cannot be combined with "the" but it could be combined with "man". So the parser has to be able to try to combine categories right from the current governor until a category remains that is a possible dependent. However, since the dependents are not combined directly with their governor but only referred to by their governor, the word "the", although it is a dependent of "man", is still positioned in between "see" and "man". Therefore, each category that has been checked successfully as a possible dependent, is marked as touched (i.e. touched by a governor) and may be skipped by the current governor. In this way, the separate categories can be maintained without blocking the parsing process.

The combination of categories right from the current governor starts a recursive process. A category right from the current governor is a governor itself and the parser will construct a maximum phrase for this governor. This maximum phrase may contain categories that could be dependents of the current governor as well.

Therefore, the parser will always examine each category separately and test if it could be a dependent of the current governor, even if it has been touched by some dependent of the current governor. An exception to this rule might b=the situation in which a category is obligatory for such a dependent, as, for example, the argument of a preposition. In this case the category is not marked as touched but as bound, indicating that it can not be part of any other phrase. However, in the generation phase the distinction in marking does not change the behavior of the parser. So, the size of a maximum phrase is not influenced by the fact whether or not a category is obligatory to one of the dependents in the maximum phrase; marking is only an indication that a category may be skipped. This leads to overgeneration, but will probably facilitate the processing of ill-formed sequences. Following this approach, in which ill-formed input is parsed as well, we will also mark categories that can neither be touched nor bound by any governor. They will not be taken into account during the generation phase and be marked as ignored. Likewise, the absence of obligatory dependents should not block the parsing process.

THE CONSISTENCY CHECK

The second phase of the parser is responsible for the combination and limitation of the maximum phrases into one or more interpretations of the complete sequence. A successfully performed consistency check results in a representation of the set of interpretations of the sequence in the form of an SSN in which at least one syntactic interpretation of each word in the sequence is present.

Given a set of well-formed maximum phrases, the parser will look for superordinate governors, i.e. categories that are not dependent on any other category. To be a proper superordinate governor, the maximum phrase of a category has to encompass the complete input sequence. The consistency check procedure takes candidate superordinate governors as a starting point and tries to do a network traversal, visiting all maximum phrases. When the governor of a maximum phrase has one or more dependents, the parser checks for each dependent whether it has more than one possible governor by investigating its parent list. For each governor it then tests whether it touches or binds the dependent. The outcome of the test controls further action:

1. The dependent is touched by (optional for) all governors; all pointers to the dependent will be changed into choice points.
2. The dependent is bound by (obligatory for) one of the governors; only for this governor the pointer to the dependent is kept, all other pointers to the dependent are deleted.
3. The dependent is bound by more than one governor; no solution is possible and an error correction procedure will be initiated.

It is already mentioned that it will be preferable to include an error correction procedure. Error correction is a prerequisite for a robust parsing process, i.e. a process that also accepts ill-formed input. In very general terms we can characterize an error correction procedure as a procedure that;

1. recognizes incorrect input and locates the error(s);
2. formulates one or more hypotheses based on the error(s) about the correct input.

The hypotheses are represented as alternative substructures that are added to the SSN. Each alternative can then be checked (if necessary after translation of the SSN) on semantic plausibility and presented to the user for evaluation.

EXAMPLES

Structural Ambiguity

Figure 10:
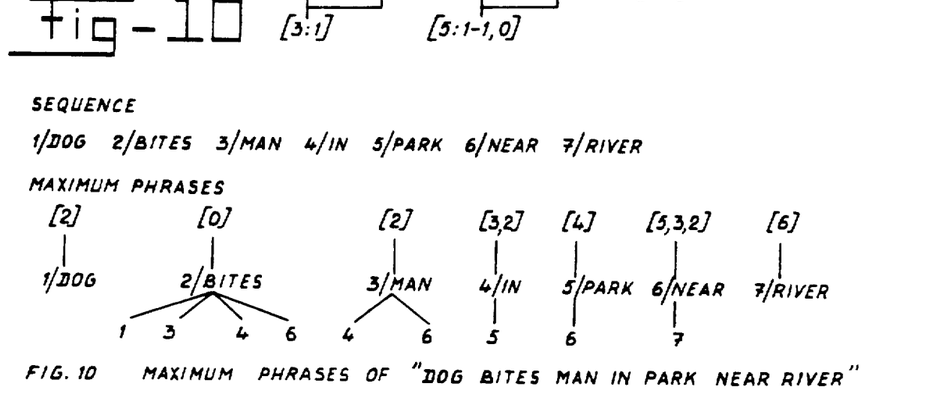
FIG. 10 illustrates the maximum phrases for a predetermined word sequence.

To illustrate the parsing process in the case of structural ambiguity we will look at the analysis of the sequence "Dog bites man in park near river". We take it that all words have a single syntactic interpretation (which they have not). Each word is assigned a unique identifier, based on its rank order in the sequence. The parser starts with constructing the maximum phrase for each word in the sequence. The result is shown in FIG. 10.

The representation of the phrases is simplified, no syntactic labels are present and the lexical nodes only contain a word and its index. The numbers in brackets dominating the lexical nodes are elements of the parent list of the phrase. The list containing 0 dominates a governor at top level. The numbers dominated by the lexical nodes are references to the dependents.

To perform the consistency check the system starts with the governor at the highest level and decides for each dependent whether 1. it should be referred to by a pointer;
2. it should be referred to by a choice point;
3. it should not be referred to at all.

Notice that choice points could be generated for all governors of a dependent in one go. Consequently, when the governor is visited at a later stage, it will already contain a choice point for the dependent. An alternative strategy will take all governors of the dependent into account, but repeat the test for each governor. Although perhaps less efficient, this approach prevents the necessity to check governors more than once. The results of the consistency test for the maximum phrases are listed in the following table.

TABLE 1

| Governor | Dependent | Parent List of Dependents | Parent List Status | Reference Type |
|---|---|---|---|---|
| 2/bites | 1/dog | [2] | single | pointer |
| 2/bites | 3/man | [2] | single | pointer |
| 2/bites | 4/in | [3,2] | multiple | choice point |
| 2/bites | 6/near | [5,3,2] | multiple | choice point |
| 1/dog | — | — | — | — |
| 3/man | 4/in | [3,2] | multiple | choice point |
| 3/man | 6/near | [5,3,2] | multiple | choice point |
| 4/in | 5/park | [4] | single | pointer |
| 5/park | 6/near | [5,3,2] | multiple | choice point |
| 6/near | 7/river | [6] | single | pointer . |
| 7/river | — | — | — | — |

Figure 11:
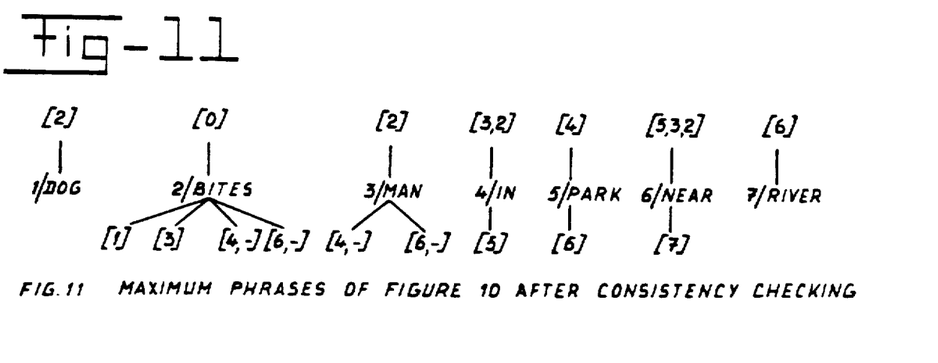
FIG. 11 illustrates the same maximum phrases as in FIG. 10 after consistency checking.

The results of the consistency check are included in the maximum phrases. This is shown in FIG. 11.

Together, the modified maximum phrases form the Structured Syntactic Network of the sequence. The graphical representation of this SSN is shown in FIG. 12.

Figures 12, 13:
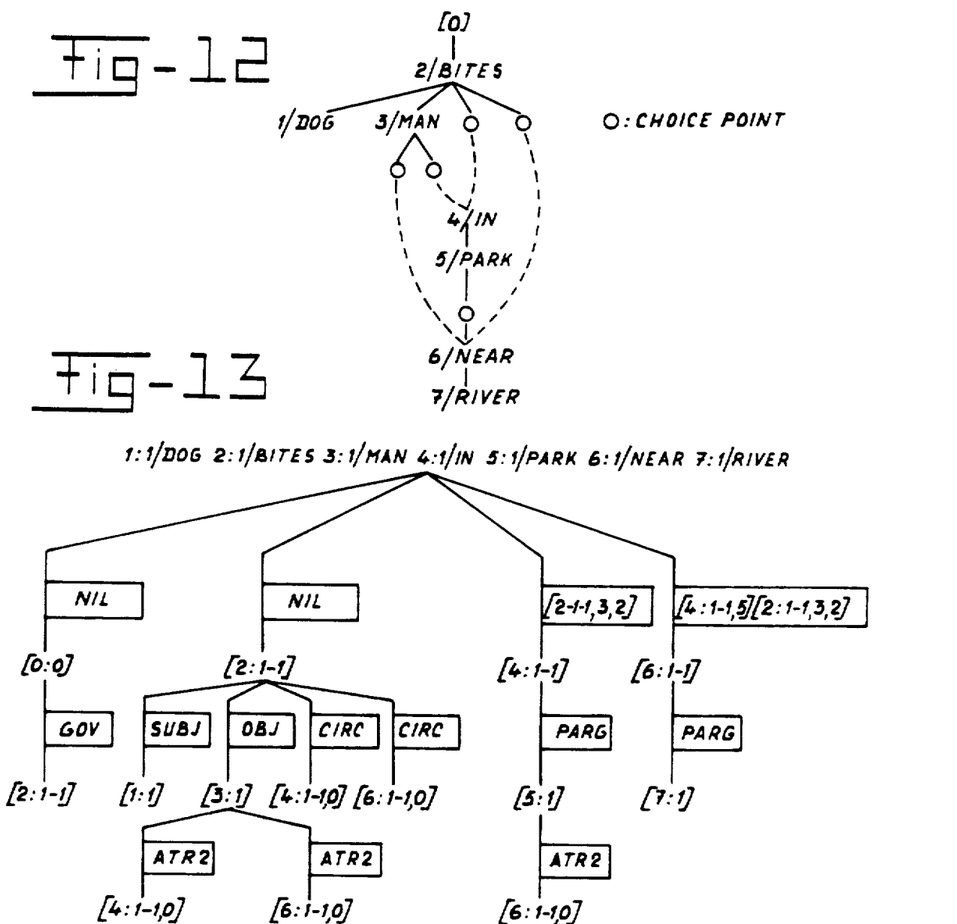
FIG. 12 illustrates very schematically the syntactic network structure.
FIG. 13 illustrates the network structure after coding the structure in agreement with the described method.

After applying the coding process described above the ultimate graph structure as illustrated in FIG. 13 is obtained.

WORD-SPECIFIC AMBIGUITY

Figure 14:
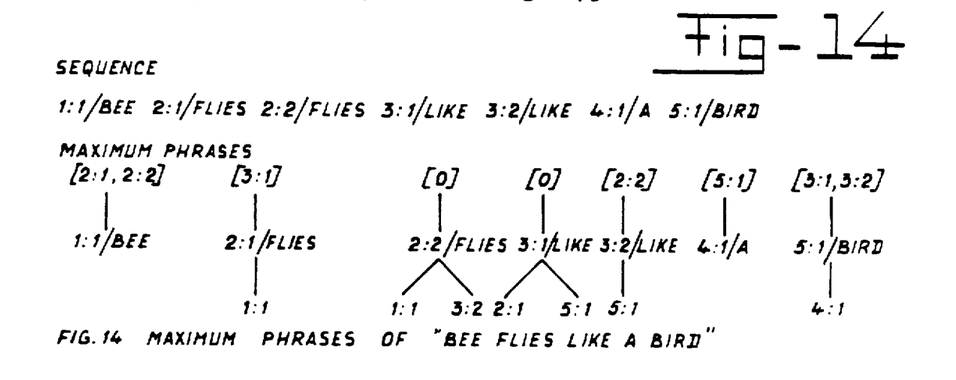
FIG. 14 illustrates the maximum phrases for another word sequence.

An example of a sequence showing word-specific ambiguity is "Bee flies like a bird" in which "flies" can be a noun or a verb and "like" can be a verb or a preposition. The two possible analyses of this sequence are already shown in FIGS. 2a and 2b. The parser starts the analysis by constructing the set of maximum phrases for the sequence, as shown in FIG. 14.

To differentiate between multiple syntactic interpretations of a word, the interpretation index is used as explained above. When constructing a maximum phrase the parser ignores the syntactic interpretations which are not a dependent of the current governor. The only requirement is that at least one of the syntactic interpretations is touched or bound by the governor or one of its dependents.

The parser performs a consistency check on the maximum phrases. In the previous example a multiple parent list resulted in the generation of choice points. However, in the case of "bee" and "bird" the parent lists contain alternative syntactic interpretations of the same word. Therefore, there is not a choice of governor for the dependents, but the sharing of a common dependent by alternative interpretations of the same word, which can be represented by providing each alternative with a pointer to the dependent.

Figure 15:
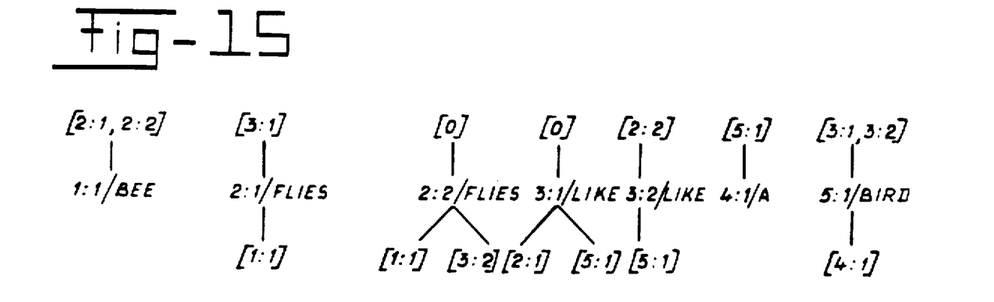
FIG. 15 illustrates the maximum phrases of FIG. 14 after the consistency check.

The consistency check results in changing each reference into a pointer in the maximum phrases (FIG. 15).

Figures 16, 17:
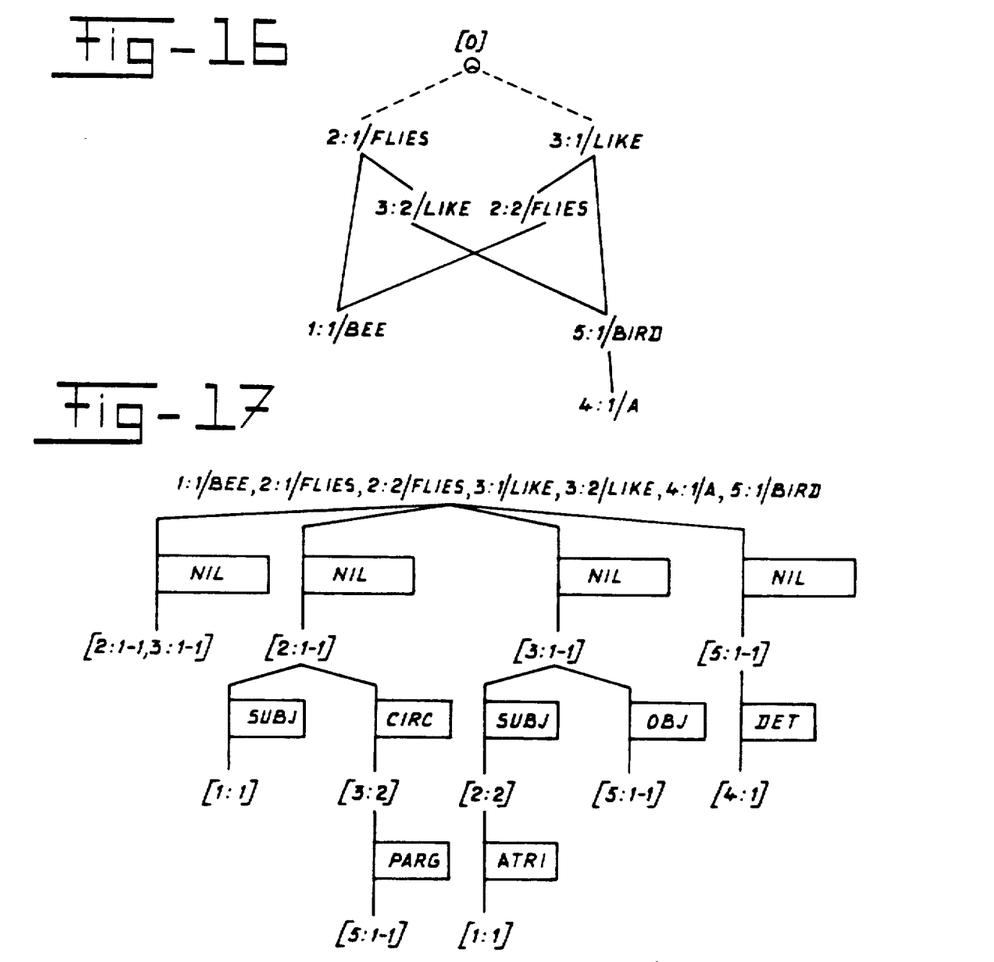
FIG. 16 illustrates very schematically the structured syntactic network before the coding procedure.
FIG. 17 illustrates in a graphical manner the ultimate SSN structure based on the maximun phrases of FIG. 15.

The Structured Syntactic Network for the sequence will contain one choice point at the highest level. FIG. 16 shows a graphical representation of the SSN and FIG. 17 shows the ultimate result obtained after applying the above-described coding process.

SUMMARY OF THE CHARACTERISTICS OF THE SSN

The Structured Syntactic Network is represented as a tree, but interpreted as a directed graph. The list of vertices of the SSN (or lexical node list) is the set of all word nodes of the alternative analyses the SSN represents. A distinction has been made between the identifier and the value of a lexical node in the node list.

The unstructured list of edges that is usually part of a graph description has been replaced by a list of unambiguous tree structures, the ssn trees. The nodes in the ssn trees, the reference nodes, contain only node or tree identifiers. Therefore, the implications of unavoidable copies of part of a subtree are not too serious with respect to storage requirements and are usually limited to the duplication of a few node identifiers and labels.

Every node in an ssn tree is interpreted as an exclusive-OR node. With one alternative it serves as a pointer, with several alternatives it models a choice point. Choice points are only present on the terminal nodes of an ssn tree.

A notational distinction has been made between references to lexical nodes and references to ssn trees. The reason is that the alternative ssn trees for a phrase may have the same top node and the addition of a duplicate index to the top node identifier provides a unique reference for each ssn tree. Also, during the generation of alternatives from the SSN, the distinction prevents confusion about the interpretation of an identifier.

THE SYNTAX OF THE SSN DESCRIPTION LANGUAGE

In this section we will give the syntax of the description language for structured syntactic networks in BNF format.

| SSN | ::= [ <atom> , <ssn_node> , <ssn_tree_list> ] |
|---|---|
| ssn_node | ::= [ <lexical_node> { , <lexical_node> }* ] |
| ssn_tree_list | ::= [ <ssn_entry> { , <ssn_tree> } + ] |
| lexical_node | ::= <node_identifier> / <term> |
| node_identifier | ::= <integer> : <integer> |
| ssn_entry | ::= [ NIL, [ 0:0 ], [[<atom>, <reference_node>, []]] |
| reference_node | ::= [<reference>] \| <choice_point> |
| choice_point | ::= [<reference>, 0] \| [<reference> {,<reference>}+] |
| reference | ::= <node_identifier> \| <tree_identifier> |
| tree_identifier | ::= <node_identifier> - <integer> |
| ssn_tree | ::= [ <root_label>, <tree_identifier>, <subtree_list>] |
| root_label | ::= [ <parent_list> { , <parent_list> }* ] \| NIL |
| parent_list | ::= [ <tree_identifier> { , <integer> }+ 9 |
| subtree_list | ::= [ <subtree> { , <subtree> }* ] \| [ ] |
| subtree | ::= [ <atom> , <reference_node> , <subtree_list> ] |

| List of abbreviations | |
|---|---|
| ATR1 | = pre-attribute |
| ATR2 | = post-attribute |
| CIRC | = circumstantial |
| DET | = determiner |
| GOV | = governor |
| NIL | = label without reference to syntactic relation |
| NP | = noun phrase |
| OBJ | = object |
| PARG | = prepositional argument |
| PP | = prepositional phrase |
| S | = starting symbol in constituent grammar parsers |
| SSN | = structured syntactic network |
| SUBJ | = subject |
| VP | = verb phrase |

I claim:

1. Method for unambiguously coding multiple parsing analyses of a natural language word sequence in dependency grammar in which dependencies are defined between pairs of words, each pair consisting of a superordinate word or governor and a thereto related word or dependent, said method comprising the following steps:

a) determining for each word in said natural language word sequence a word index, representing the rank of order of said word in said sequence, determining for each word all dependents thereof permitted by the grammar and determining the relation between said word and said dependents using a parsing algorithm in combination with a grammar defining all the permitted dependency relations in the language and a dictionary in which all words of the language are stored together with their syntactic interpretation and an interpretation index, representing the rank order of the syntactic interpretation of the word in the dictionary in order to distinguish between multiple syntactic interpretations of said word, b) defining a syntactic network which is represented as a tree consisting of nodes mutually coupled by edges and comprising at least one top node, one or more terminal nodes and eventually a number of intermediate nodes, each node being interpreted as an exclusive OR node serving as a pointer if there is only one alternative and serving as a choice point if there are several alternatives, whereby each of the pointer nodes is assigned to a word of the sequence and each edge is assigned to the syntactic relation between the two nodes coupled by said edge, whereby each node is coded by an identifier which in case of a pointer node is directly related to the entry of a word in the dictionary and in the case of a choice point comprises a list of further identifiers one of which has to be selected.

2. Method according to claim 1, wherein the syntactic network comprises at least one tree structure each consisting of a top node functioning as governor for at least one dependent, said dependents being selected from the group consisting of lexical nodes and top nodes of subtree structures whereby a tree identifier is added to each top node of a tree or subtree structure, said tree identifier consisting of the node identifier referring to the word from the sequence assigned to said node combined with a duplicate index.

3. Method according to claim 2, wherein the node identifier for each node comprises the word index and interpretation index of the word assigned to said node.

4. Method according to claim 3, wherein the top node of the first tree of the network functions as a network entry node and that the node identifier of said top node comprises a unique combination of a word index and interpretation index, not assigned to any word in the dictionary, and that said top node furthermore comprises a list of reference to at least one of the tree structures in the syntactic network.

5. Method according to claim 4, wherein the references in the list are arranged in a predetermined order.

6. Method according to claim 1, wherein in step a) the words of the sequence are scanned in their natural order, whereby each word belonging to a syntactic category in the dependency grammar and taking dependents is considered as a possible governor and whereby for each possible governor the sequence is searched in the natural order for dependents, the syntactic relation between a possible governor and each dependent is determined and a subtree is added to the governor with a pointer node containing the word index of the dependent, whereby if the dependent is optional the pointer node also contains a reference to the null tree, whereafter a consistence check procedure is carried out determining for each dependent whether or not it has more than one possible governor and determining whether the dependent is optional for all governors, in which case all pointers to the dependent will be changed into choice points, or if the dependent is obligatory for one of the governors in which case only for this governor the pointer to the dependent is maintained and all other pointers to the dependent are deleted.

7. Method according to claim 6, characterized in that if a dependent is obligatory for more than one governor an error correction procedure will be initiated.

* * * * *